(12) United States Patent
Laraia et al.

(10) Patent No.: US 7,398,173 B2
(45) Date of Patent: Jul. 8, 2008

(54) PROVIDING NONLINEAR TEMPERATURE COMPENSATION FOR SENSING MEANS BY USE OF PADÉ APPROXIMANT FUNCTION EMULATORS

(75) Inventors: Jose Marcos Laraia, Pocatello, ID (US); David John Willis, Murray, UT (US)

(73) Assignee: AMI Semiconductor, Inc., Pocatello, ID (US)

( * ) Notice: Subject to any disclaimer, the term of this patent is extended or adjusted under 35 U.S.C. 154(b) by 0 days.

(21) Appl. No.: 11/123,964

(22) Filed: May 4, 2005

(65) Prior Publication Data

US 2006/0265167 A1 Nov. 23, 2006

(51) Int. Cl.
*G01K 15/00* (2006.01)
*G01K 19/00* (2006.01)
(52) U.S. Cl. .................................................. 702/99
(58) Field of Classification Search .................. 702/99, 702/104, 107, 130
See application file for complete search history.

(56) References Cited

U.S. PATENT DOCUMENTS

| | | | | |
|---|---|---|---|---|
| 5,764,067 A | 6/1998 | Rastegar | ..................... | 324/725 |
| 5,848,383 A | 12/1998 | Yunus | ......................... | 702/104 |
| 5,902,925 A | 5/1999 | Crispie et al. | ................. | 73/1.88 |
| 5,995,033 A | 11/1999 | Roeckner et al. | ............ | 341/155 |
| 6,032,109 A | 2/2000 | Ritmiller, III | ............... | 702/104 |
| 7,006,938 B2 * | 2/2006 | Laraia et al. | ................. | 702/104 |
| 7,190,178 B2 * | 3/2007 | Laraia et al. | ................. | 324/685 |
| 2003/0096425 A1 | 5/2003 | Berk et al. | ................... | 436/171 |
| 2005/0256660 A1 * | 11/2005 | Laraia et al. | ................. | 702/107 |

OTHER PUBLICATIONS

International Search Report, PCT/US06/015793, mailing date Aug. 14, 2006.

* cited by examiner

*Primary Examiner*—Michael P Nghiem
(74) *Attorney, Agent, or Firm*—MacPherson Kwok Chen & Heid LLP

(57) ABSTRACT

Sensors and/or transducers can exhibit nonlinear response to temperature changes in terms of offset and also in terms of sensitivity to variations in a sensed physical attribute (pressure, strain, displacement, etc.). Padé Approximant function emulators are used to model the nonlinear offset and/or nonlinear sensitivity behaviors of a given sensing device relative to one or more temperature sub-ranges and to produce temperature compensating corrections for offset and/or sensitivity as may be desired.

31 Claims, 11 Drawing Sheets

600

700

800

880

900

1000

PROVIDING NONLINEAR TEMPERATURE COMPENSATION FOR SENSING MEANS BY USE OF PADÉ APPROXIMANT FUNCTION EMULATORS

FIELD OF DISCLOSURE

The present invention relates generally to sensors and/or transducers that exhibit nonlinear behavior in response to temperature changes. The invention relates more specifically to efficient and accurate methods of compensating for such nonlinear behavior of sensing means in environments that have changing temperature.

CROSS REFERENCE TO CO-OWNED APPLICATIONS

The following copending U.S. patent applications are owned by the owner of the present application, and their disclosures are incorporated herein by reference:

(A) Ser. No. 10/845,681 filed May 13, 2004 by Jose Marcos Laraia, Jose G. Taveira, Robert P. Moehrke and which was originally entitled, Pade' Approximant Based Compensation for Integrated Sensor Modules and the Like; and (B) Ser. No. 10/870,314 filed Jun. 16, 2004 by Jose Marcos Laraia, Masahisa Niwa, Robert P. Moehrke and Jose G. Taveira and which was originally entitled, Reactive Sensor Modules Using Pade' Approximant Based Compensation and Providing Module-Sourced Excitation, and has subsequently issued as U.S. Pat. No. 7,006,938

DESCRIPTION OF RELATED ART

Technological advancements have made possible a plethora of new electronic and/or electromagnetic sensors or transducers that are mass producible for a variety of uses. Temperature, pressure, luminosity, position, acceleration, flow rate are just a few of the many physical variables that can be sensed, measured and/or communicated with such devices. The sensed or measured parameters can be transmitted electromagnetically or otherwise to a computer or other intelligent device for display, control and/or other processing. Because of the importance of accurate sensing or measuring of physical parameters in a number of fields of application, such as in the automotive industry, medicine, aerospace and factory automation, considerable effort has been dedicated to developing low cost sensing devices that are small, accurate, reliable, and capable of operating in harsh environments. This has led to a variety of sensing means based on different physical/electrical principles, each one optimized for specific applications.

When a physical quantity is being sensed or measured for the purpose of subsequent processing or reporting of its value (s), a translation invariably occurs from the domain of the sensed/measured physical quantity (be it pressure, or magnetic flux intensity, or motor current in a high voltage industrial application, or some other such parameter) to the domain of the representative signals (e.g., low voltage, digital CMOS signals, for example in the 0-5 volt range), where the representative signals will be used for the subsequent processing and/or reporting of the sensed/measured physical quantity. Somewhere in the domain-to-domain translating pathway, there may be one or more elements (e.g., sensor or transducer) whose behaviors are significantly affected by temperature change. For lack of a better term, a set of one or more such temperature-dependent elements will be understood herein to be part of a "sensing means". Regardless of the underlying physical principles used in translation process, essentially all sensing means (i.e., sensing or transducing elements) exhibit some limitations and nonidealities that need to be circumvented. For instance, most sensors typically exhibit offset and sensitivity variations due to normal tolerances allowed by manufacturing process variation. Such offset and/or sensitivity variations often have to be compensated for by way of individualized calibration of the sensor interface circuitry. Also, to some extent, essentially all sensing means present variations in response over temperature. This too may need to be compensated for by way of individualized corrections. An appropriate electronic circuit, usually referred to as a signal conditioning circuit, is often tied (electrically, logically and/ or physically) to each individual sensing means to take care of these requirements. In many cases, the signal conditioning circuit is an integral part of the packaging or housing that contains part or all of the sensing means. Often, a sensing element and its corresponding signal conditioning circuit are commonly packaged in a single physical unit to constitute a sensor module. More detailed explanations on sensor signal conditioning and examples of available solutions can be found in the following three articles (incorporated here by reference): (a) Mnif, K., "Compensation is critical in fitting analog pressure sensors to the application", ISD Magazine, July 2001; (b) Travis, B., "Smart conditioners rub out sensor errors", EDN Magazine, February 2001; and (c) McGonigal, J., "Signal conditioning", Sensor Magazine, September 2003.

Temperature compensation (TC) is a fundamental requirement in most sensor signal conditioning systems, as it enables a higher degree of accuracy and/or an extended operating temperature range without calling for the use of much more sophisticated and expensive sensing elements. Methods for TC vary, but most commonly involve multiplying the sensor output signal by a temperature-dependent gain value after having first subtracted out a temperature-dependent offset value. See for example: (a) U.S. Pat. No. 5,848,383 issued December 1998 to Yunus (provides polynomial compensation of temperature coefficient); (b) U.S. Pat. No. 5,902,925 issued May 1999 to Crispie et al (provides piece-wise linear compensation of temperature coefficient); (c) U.S. Pat. No. 5,995,033 issued November 1999 to Roeckner et al (uses DAC for setting offset); (d) U.S. Pat. No. 5,939,693 issued August 1999 to Roeckner et al (uses a signal conditioning circuit with DACs, and a combo ADC/DAC for signal conversion and polynomial calculation for temperature and nonlinearity compensation); and (e) U.S. Pat. No. 6,032,109 issued February 2000 to Ritmiller, III (uses coarse and fine DAC's driven by DSP (Digital Signal Processor))—all incorporated herein by reference. As indicated from the preceding brief descriptions of Yunus '383, etc., temperature-dependent offset and gain control may be achieved with piece-wise linear function generation, with polynomial function generation and/or with complex digital signal processing techniques. However, due to market pressure for ever-higher accuracies and ever-cheaper solutions, sometimes the more traditional linear or piecewise linear TC techniques are not capable of providing the required performance over a given temperature range. The polynomial-based, nonlinear temperature compensation techniques that are generally used usually do not provide a very good fit with sensing elements that do not behave in a polynomial mannerism (e.g., $y=a_0+a_1x^1+a_2x^2+\ldots$). Therefore accuracy may still be insufficient over a given temperature range unless a large number of terms are used in each polynomial expression, and perhaps different polynomials are stitched together in piecewise manner. This greatly increases circuit complexity and cost. A simpler and better solution is needed.

SUMMARY

Structures and methods may be provided in accordance with the present disclosure of invention for improving over the above-summarized shortcomings of prior temperature compensation techniques.

More specifically, a nonlinear temperature compensation methodology is provided here that can be easily made accurate, programmable, and sufficiently flexible to be used in a wide range of applications, including providing temperature compensation for enabling low-cost mass production of individually calibrated sensing means. Circuitry in accordance with the invention can be made simple enough to be easily implemented as small functional blocks in the monolithic sensor interface integrated circuits (ICs) that usually accompany sensors.

The present disclosure of invention provides a way to realize numerical division without use of brute force numerical techniques. The present invention may be practiced with use of so-called Padé Approximants, which may be derived by expanding a to-be-emulated function, at least piece-wise, as a ratio of two power series (a division of the two polynomials) and determining the coefficients in both the numerator and denominator power series. Padé approximations are suitable to model nonlinear physical variables and mathematical functions that contain poles. Also, a rational approximation can follow curves that are not essentially polynomial. In particular, the rational functions generated by the Padé Approximants method are generally a better fit for physical sensor behavior than are Taylor expansions with a comparably larger number of terms. One of the obstacles presented heretofore to using Padé Approximants in practical implementations is the need for forming a ratio of the two power series. Brute force division is generally more costly than machine-implemented computations that rely only on addition, subtraction or multiplication. In accordance with the invention, feedback techniques are used to provide a transfer function that emulates the division operation that is called for by the Padé Approximants methodology.

In accordance with one aspect of the invention, one or more inverse Padé Approximant transfer functions are applied to a signal generated by a temperature-affected sensing means in order to cancel out its nonlinearities with respect to temperature variation in a given temperature range and to thereby provide more precise sensing (or domain translation) over the given temperature range. Accurate approximations can be implemented with low-order Padé Approximant functions (those having only a few coefficients). This results in high-performance while allowing for relatively simple and inexpensive nonlinearity compensation circuitry. More specifically, in one embodiment, the sensor offset is modeled at least in part by a first Padé Approximant generating circuit having temperature as its input variable and the sensor gain inverse is modeled at least in part by a second Padé Approximant generating circuit also having temperature as its input variable. Methods for calibrating such circuits in a mass production environment will be detailed.

Other aspects of the disclosure will become apparent from the below detailed description.

BRIEF DESCRIPTION OF THE DRAWINGS

The below detailed description section makes reference to the accompanying drawings, in which.

DETAILED DESCRIPTION

Padé Approximants may be formed by expanding a function as a ratio of two power series and determining both the numerator and denominator coefficients. Padé Approximants are usually superior to Taylor expansions when the modeled functions contain poles, because the use of rational functions allows such pole behavior to be well-represented. (See for example: the Wolfram Research Mathworld Web internet site, mathworld(dot)wolfram(dot)com/Pade-Approximant(dot) html).

In its general form, a Padé Approximant may be expressed as the ratio between two power series per equation Eq. 1:

$$\frac{P_L(x)}{Q_M(x)} = \frac{p_0 + p_1 x + p_2 x^2 + \ldots + p_L x^L}{1 + q_1 x + q_2 x^2 + \ldots + q_M x^M} \quad \text{(Eq. 1)}$$

wherein x is the input variable, $p_L$ and $q_M$ are relatively constant coefficients and $Q_M(x)$ is normalized in the example to provide $Q_M(O)=1$. If coefficients $q_1$ through $q_M$ are set to zero, then equation Eq. 1 reduces to a Taylor expression having just the numerator coefficients, $p_0$ through $p_L$.

A Padé Approximant $y_1(x)$ having 1st order polynomials in both its numerator and denominator can be expressed in accordance with the following equation Eq. 2:

$$y_1(x) = \frac{P_1(x)}{Q_1(x)} = \frac{ax+b}{cx+1} \quad \text{(Eq. 2)}$$

Figure 1:
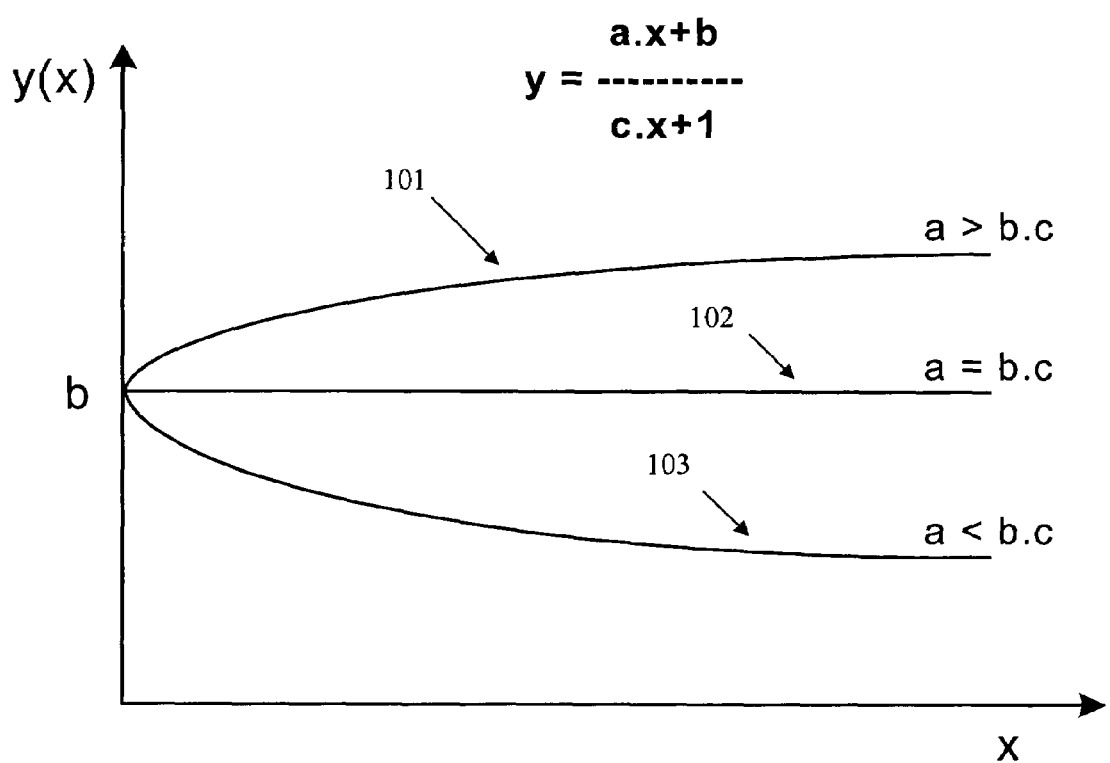
FIG. 1 is a first graph of three functions that can be emulated by a first order Padé' Approximant circuit.
Figure 2:
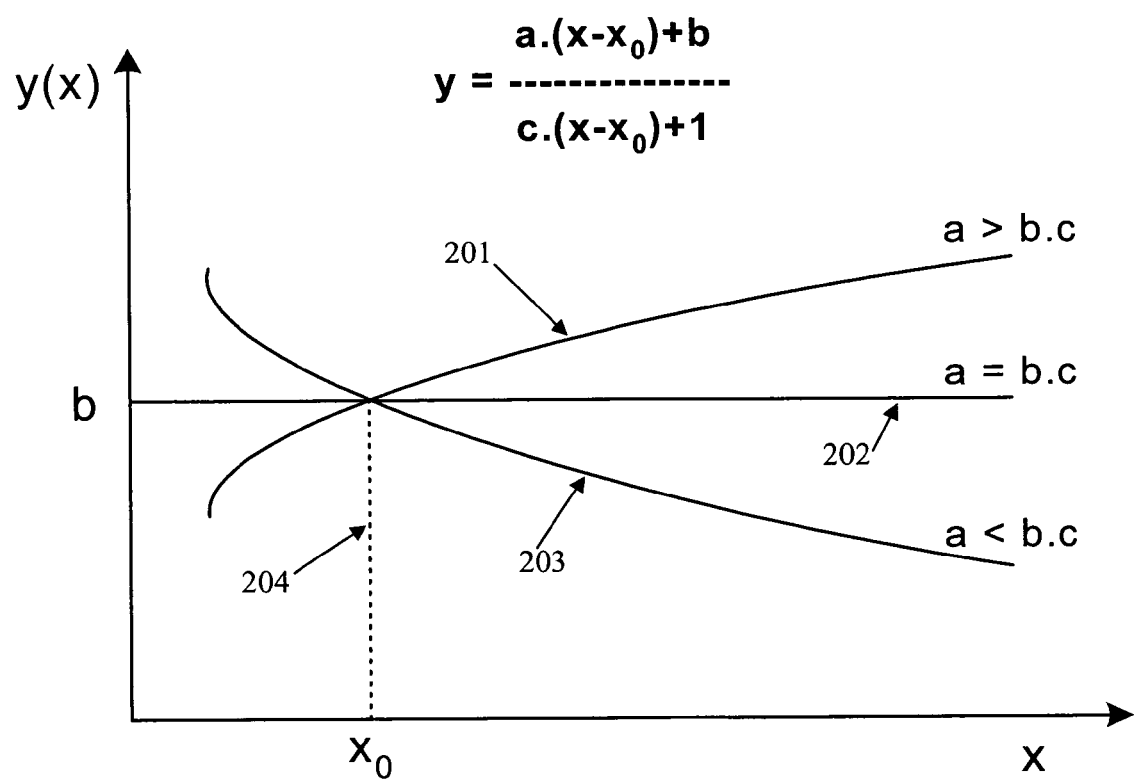
FIG. 2 is a second graph of three more functions that can be emulated by a slightly different first order Padé' Approximant circuit.
Figure 3:
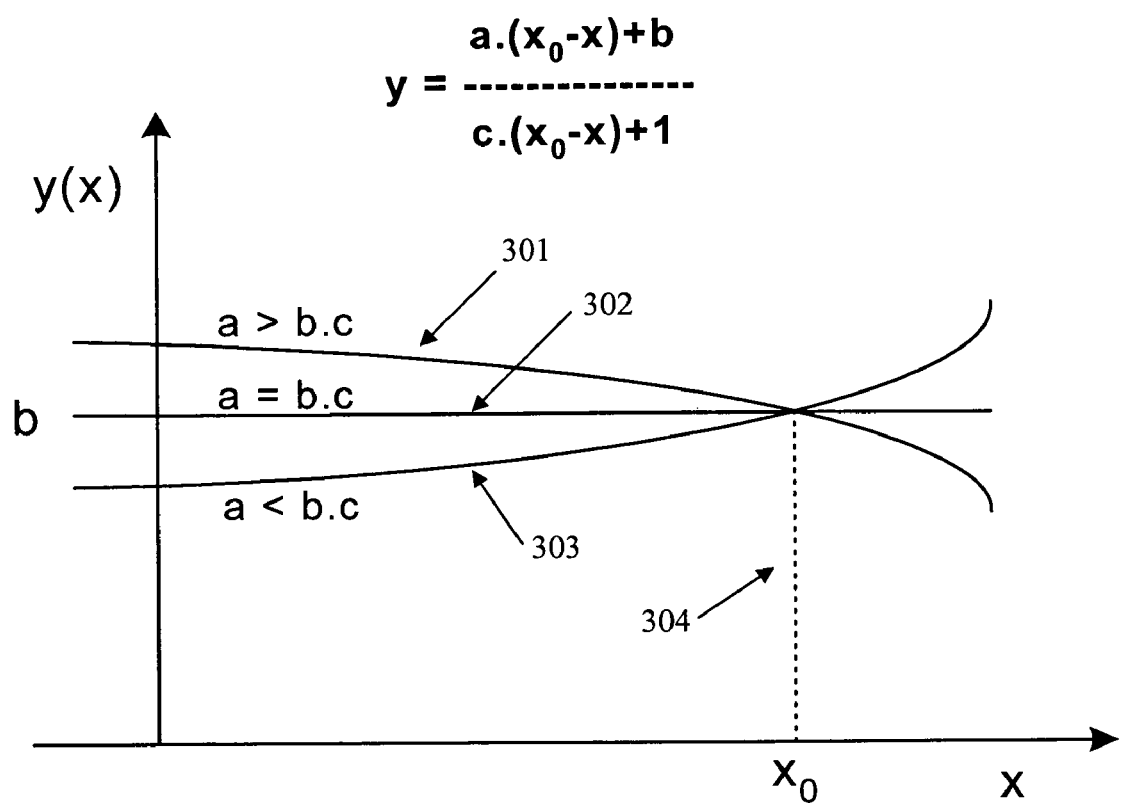
FIG. 3 is a third graph of three further functions that can be emulated by a yet different first order Padé' Approximant circuit.

By adjusting the input signal, x (including its polarity and effective origin) and by adjusting the respective magnitudes of coefficients a, b, and c; different types of nonlinear functions can be achieved. FIGS. 1, 2, and 3 show some possible transfer function formats, with $y_1(x)$ being rewritten in formats easier to correlate with the illustrated curves. As should be apparent from FIGS. 1-3, the position, orientation, and slope of each function curve can be adjusted by adjusting the three coefficients, a, b and c and by adjusting the polarity and effective origin of the input variable, x. In the special case where a/c=b, then $y_1(x)$ takes on a constant value equal to b. On the other hand, if a/c>b or a/c<b, then a corresponding nonlinear function is obtained and the identities of the following expressions, Ex. 3-Ex. 5 are readily verified:

for FIG. 1: $\begin{cases} y(0) = b \\ \lim_{x \to \infty} y(x) = \frac{a}{c} \end{cases}$ (Ex. 3)

for FIG. 2: $\begin{cases} y(x_0) = b \\ \lim_{x \to \infty} y(x) = \frac{a}{c} \end{cases}$ (Ex. 4)

for FIG. 3: $\begin{cases} y(x_0) = b \\ \lim_{x \to -\infty} y(x) = \frac{a}{c} \end{cases}$ (Ex. 5)

More specifically, in FIG. 1, nonlinear curve 101 has the value b at x=0 and the asymptote given by Ex. 3 in the case where a/c>b. Nonlinear curve 103 has the value b at x=0 and the asymptote given by Ex. 3 in the case where a/c<b. Constant response 102 is achieved when a/c=b. Similar results are seen in FIG. 2 except that the three plots, 201-203 intersect at the point where $x=x_0$ (at 204). Similar results are seen in FIG. 3 except that the three plots, 301-303 extend in the opposite lateral direction because the input variable, x is given a negative polarity. Note that $y_1(x)$ is undefined when cx+1=0 and thus the condition cx=−1 should be avoided.

As indicated above, sensing elements typically generate an electromagnetic output signal that includes an offset component that varies in a nonlinear fashion over temperature and that includes a gain or sensitivity parameter that further varies in a nonlinear fashion over temperature. By using 1st order Padé Approximants in combination with environmental temperature (T, in other words, the effective temperature that the sensing means is being subjected to) being provided as the input variable, the temperature dependency of a sensing means can generally be represented to a good degree of accuracy by the following equation Eq. 6:

$$V_S(T) \cong \left[ voff_0 + \left( \frac{a \cdot T + b}{c \cdot T + 1} \right) \right] + \left[ S_0 \cdot \left( \frac{A \cdot T + B}{C \cdot T + 1} \right) \cdot \Phi \right]$$ (Eq. 6)

where: the left side $V_S(T)$ is the actual sensing element output voltage (although in alternate types of sensing means it could be current or charge or some other electromagnetic parameter in some sensors); and where in the right side of the approximation, $voff_0$ is a sensing element offset result that appears at the sensor output when the sensed physical parameter (e.g., pressure) is at a reference or zero magnitude (e.g., 1 atmosphere in the case of pressure) and where this $voff_0$ output is measured at a certain reference temperature, $T_0$. Coefficients a, b, and c are nonlinear offset temperature coefficients whose values are established during calibration. $S_0$ is the sensing element sensitivity (or gain) at the utilized reference temperature, $T_0$. The capitalized A, B, C terms are nonlinear sensitivity temperature coefficients whose values are also established during calibration. Finally, $\Phi$ is the physical parameter that is being sensed by the modeled sensing means so as to produce the actual sensor output signal: $V_S(T)$. Examples of $\Phi$ may include pressure levels, mechanical strains, mechanical displacements, intercepted radiations or other energy fields, and so forth.

In accordance with the invention, counter-compensation is provided for the temperature dependency of the sensor offset component by generating a counter-offset signal, $V_{off}(T)$ per equation Eq. 7:

$$V_{off}(T) \cong \left[ voff_0 + \left( \frac{a \cdot T + b}{c \cdot T + 1} \right) \right]$$ (Eq. 7)

Further in accordance with the invention, counter-compensation is provided for the temperature dependency of the sensor gain by finding an inverse of equation Eq. 8:

$$G_{sensor}(T) \cong \left[ S_0 \cdot \left( \frac{A \cdot T + B}{C \cdot T + 1} \right) \right]$$ (Eq. 8)

While the disclosure focuses on using Padé Approximants in combination with "sensed" temperature (T) for adjusting the sensor output signal, it should be noted that it is within the contemplation of the invention to additionally use Padé Approximants in combination with the temperature corrected results for further compensating (pre-compensation or post compensation) for nonlinearities in the complete signal path or paths, namely, to compensate for nonlinear response of the secondary sensor means that is used to sense the "sensed" temperature (T), and/or to compensate for nonlinear response of the analog signal paths (if any) that transmit signals representing these quantities. By calibrating while using the signal level present at the actual output pin of a compensation IC, some of the internal nonlinearities within the signal-processing IC itself are inherently compensated for. It is also within the contemplation of the invention to additionally use Padé Approximants in combination with the above to compensate for nonlinear response of the primary sensor to different magnitudes or magnitude ranges of the physical parameter ($\Phi$) that is being sensed by the modeled sensing means.

Focusing first on the counter-offset signal, $V_{off}(T)$ of equation Eq. 7, the 3 unknown coefficient values, a, b and c can be resolved (as one but not the only method) by taking a corresponding set of at least 3 offset measurements relative to a reference point, say, $Voff_0$, and at respective temperature points $T_1$, $T_2$ and $T_3$ per the following equations set, Eqs. 9:

$$\begin{cases} a \cdot T_1 + b - c \cdot T_1 \cdot \Delta voff_1 = \Delta voff_1 \\ a \cdot T_2 + b - c \cdot T_2 \cdot \Delta voff_2 = \Delta voff_2 \\ a \cdot T_3 + b - c \cdot T_3 \cdot \Delta voff_3 = \Delta voff_3 \end{cases}$$ (Eqs. 9)

where $$\Delta voff_n = voff_n - voff_0$$ (Eq. 10)

From equations set, Eqs. 9 the 3 coefficients a, b, c can be easily calculated, for instance by using determinants (Cramer's Rule) per equations set, Eqs. 11, 12, 13a-13c:

$$a = \frac{D_a}{D}$$ (Eq. 11)

$$b = \frac{D_b}{D}$$

$$c = \frac{D_c}{D}$$

where $$D = \begin{vmatrix} T_1 & 1 & -T_1 \cdot \Delta voff_1 \\ T_2 & 1 & -T_2 \cdot \Delta voff_2 \\ T_3 & 1 & -T_3 \cdot \Delta voff_3 \end{vmatrix} \quad \text{(Eq. 12)}$$

$$D_a = \begin{vmatrix} \Delta voff_1 & 1 & -T_1 \cdot \Delta voff_1 \\ \Delta voff_2 & 1 & -T_2 \cdot \Delta voff_2 \\ \Delta voff_3 & 1 & -T_3 \cdot \Delta voff_3 \end{vmatrix} \quad \text{(Eq. 13a)}$$

$$D_b = \begin{vmatrix} T_1 & \Delta voff_1 & -T_1 \cdot \Delta voff_1 \\ T_2 & \Delta voff_2 & -T_2 \cdot \Delta voff_2 \\ T_3 & \Delta voff_3 & -T_3 \cdot \Delta voff_3 \end{vmatrix} \quad \text{(Eq. 13b)}$$

$$D_c = \begin{vmatrix} T_1 & 1 & \Delta voff_1 \\ T_2 & 1 & \Delta voff_2 \\ T_3 & 1 & \Delta voff_3 \end{vmatrix} \quad \text{(Eq. 13c)}$$

If more than three measurement equations are generated, then statistical curve fitting algorithms may be used for resolving the values of the three offset coefficients: a, b, and c. After determining the three offset coefficients: a, b, c, the offset compensation circuit simply has to synthesize the negative of the temperature dependent, nonlinear function and to add that negative correction signal to the sensor output signal, per equation Eq. 14 so as to leave behind only the temperature-independent offset component, $voff_0$ which remains substantially constant over the relevant temperature range defined by T1, T2 and T3.

$$voff(T) = voff_0 + \left(\frac{a \cdot T + b}{c \cdot T + 1}\right) - \left(\frac{a \cdot T + b}{c \cdot T + 1}\right) = voff_0 \quad \text{(Eq. 14)}$$

Figure 4:
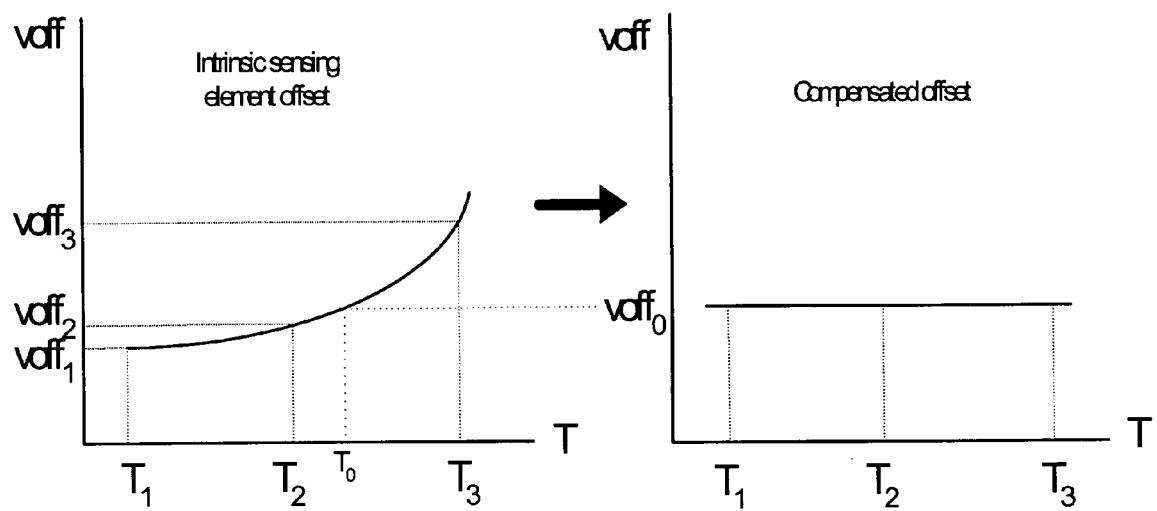
FIG. 4 graphs a desired sensor, counter-offset function.

Referring to FIG. 4, the process is shown graphically, where $T_1$, $T_2$ and $T_3$ are the temperatures of the respective three measurement points that produce respective sensor output voltages, $V_{off1}$, $V_{off2}$ and $V_{off3}$ when there is a corresponding zero point for the sensor's physical input parameter (e.g., pressure, where the zero point would be say, 1 atmosphere). $T_0$ is a temperature where the sensor naturally outputs the constant component, $V_{off0}$. After subtraction of the temperature varied response, all that is left is the temperature invariant, offset response, $V_{off0}$ as is shown in the right side of FIG. 4.

Figure 5:
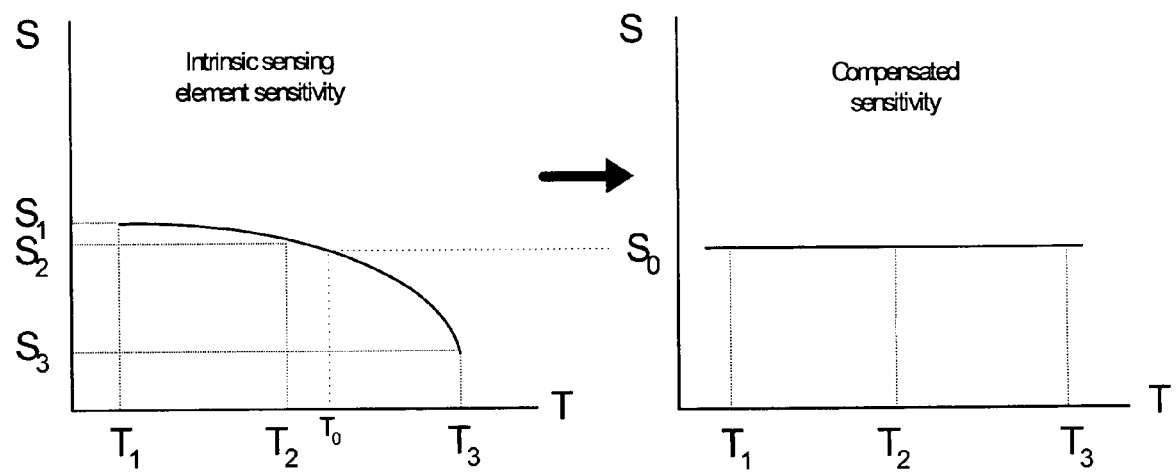
FIG. 5 graphs a desired sensor counter-gain function.

Referring to FIG. 5, a similar approach may be taken with the sensor's gain or sensitivity over the relevant temperature range which encompasses measurement points, T1, T2 and T3. More specifically, temperature variations for sensor sensitivity may be described by a nonlinear multiplicative factor such as shown in equation Eq. 8 above instead of by the additive factor used for offset. The nonlinearity counter-compensation for the temperature sensitivity, S(T) of a given sensor can be calculated in an analogous way to how it was done for offset except that the physical parameter input value has to be something other than a relative zero point. In accordance with the disclosure, sensitivity is measured for at least three different temperatures T1, T2, and T3 and the corresponding values are recorded as S1, S2, and S3, respectively. For more consistent results the excitation should be the same in each case, typically full scale or half scale of the measured physical attribute (e.g., pressure).

Equation Eq. 8 is re-expressed here as the function S(T):

$$S(T) = S_0 \cdot \left(\frac{A \cdot T + B}{C \cdot T + 1}\right) \quad \text{(Eq. 15)}$$

Replacing T with known temperatures and S(T) with measured relative sensitivities, the following system of at least three equations (Eqs. 16a-16c) with three unknowns A, B, C can be obtained:

$$\begin{cases} A \cdot T_1 + B - C \cdot T_1 \cdot \Delta S_1 = \Delta S_1 \\ A \cdot T_2 + B - C \cdot T_2 \cdot \Delta S_2 = \Delta S_2 \\ A \cdot T_3 + B - C \cdot T_3 \cdot \Delta S_3 = \Delta S_3 \end{cases} \quad \text{(Eqs. 16a-16c)}$$

where $$\Delta S_n = \frac{S_n}{S_0} \quad \text{(Eq. 17)}$$

and $S_0$ (see FIG. 5) is the sensitivity at temperature $T_0$.

From equations set, Eqs. 16a-16c, the coefficients A, B, C can also be calculated by Cramer's Rule:

$$A = \frac{D_A}{D_S} \quad \text{(Eqs. 18a-c)}$$

$$B = \frac{D_B}{D_S}$$

$$C = \frac{D_C}{D_S}$$

where $$D_S = \begin{vmatrix} T_1 & 1 & -T_1 \cdot \Delta S_1 \\ T_2 & 1 & -T_2 \cdot \Delta S_2 \\ T_3 & 1 & -T_3 \cdot \Delta S_3 \end{vmatrix} \quad \text{(Eq. 19s)}$$

$$D_A = \begin{vmatrix} \Delta S_1 & 1 & -T_1 \cdot \Delta S_1 \\ \Delta S_2 & 1 & -T_2 \cdot \Delta S_2 \\ \Delta S_3 & 1 & -T_3 \cdot \Delta S_3 \end{vmatrix} \quad \text{(Eq. 19A)}$$

$$D_B = \begin{vmatrix} T_1 & \Delta S_1 & -T_1 \cdot \Delta S_1 \\ T_2 & \Delta S_2 & -T_2 \cdot \Delta S_2 \\ T_3 & \Delta S_3 & -T_3 \cdot \Delta S_3 \end{vmatrix} \quad \text{(Eq. 19B)}$$

$$D_C = \begin{vmatrix} T_1 & 1 & \Delta S_1 \\ T_2 & 1 & \Delta S_2 \\ T_3 & 1 & \Delta S_3 \end{vmatrix} \quad \text{(Eq. 19C)}$$

As was the case with offset, if more than three measurements are taken, then statistical curve fitting techniques (e.g., least square error) may be used to resolve the three sensitivity coefficients A, B, and C. After determining coefficients A, B, C, the sensitivity counter-compensation circuit is structured to synthesize an inverse nonlinear function that, when multiplied by the original sensitivity function, keeps the resulting sensitivity substantially constant and equal to S0 over the temperature range defined by T1, T2 and T3, according to equation Eq. 20 below:

$$S'(T) = S_0 \cdot \left(\frac{A \cdot T + B}{C \cdot T + 1}\right) \cdot \left(\frac{x \cdot T + y}{z \cdot T + 1}\right) = S_0 \qquad \text{(Eq. 20)}$$

The correcting function, $$\left(\frac{x \cdot T + y}{z \cdot T + 1}\right)$$

can be called the "Inverse Padé Approximant" with respect to the sensor's natural sensitivity, $$\left(\frac{A \cdot T + B}{C \cdot T + 1}\right),$$

as their product equals unity (1).

By setting the x, y and z coefficients per equations set Eqs. 21:

$$\begin{cases} x = C/B \\ y = 1/B \\ z = A/B \end{cases} \qquad \text{(Eqs. 21)}$$

the sensitivity equation (Eq. 20) can be rewritten so that the modified result, S'(T) becomes constant and equal to $S_0$:

$$\begin{aligned} S'(T) &= S_0 \cdot \left(\frac{A \cdot T + B}{C \cdot T + 1}\right) \cdot \left(\frac{\frac{C}{B} \cdot T + \frac{1}{B}}{\frac{A}{B} \cdot T + 1}\right) \qquad \text{(Eq. 22)} \\ &= S_0 \cdot \left(\frac{A \cdot T + B}{C \cdot T + 1}\right) \cdot \left(\frac{C \cdot T + 1}{A \cdot T + B}\right) \\ &= S_0 \end{aligned}$$

This demonstrates how the sensitivity compensation with the coefficient settings of equation set Eqs. 21 results in a temperature-invariant sensitivity.

Figure 6:
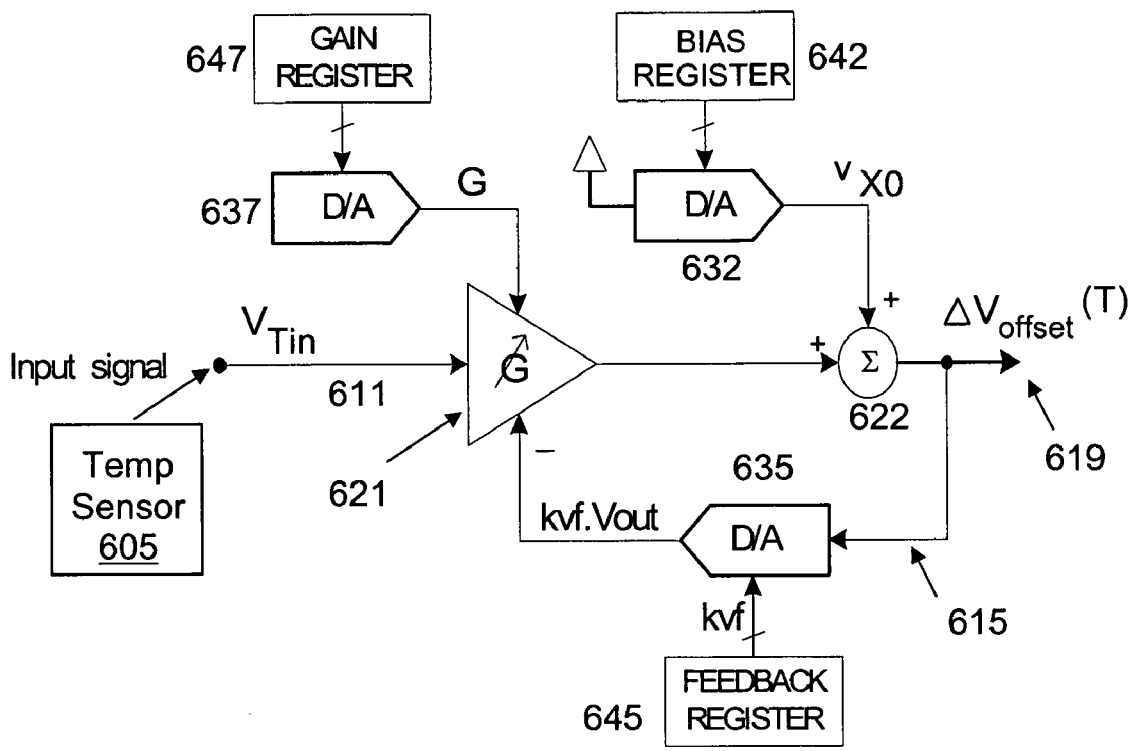
FIG. 6 is a schematic diagram showing a first circuit for generating a counter-offset that is to be subtracted from a sensor output signal to thereby remove temperature dependent offset.

Referring to FIG. 6, a first temperature compensation circuit 600 in accordance with the invention is shown. As explained above in theoretical terms, a first Padé Approximant function will be emulated by the illustrated compensation circuit 600 in order to produce a temperature-dependent voltage signal, $\Delta v_{off}(T)$ that will be subtracted from the sensing element output signal offset in order to reduce or eliminate the temperature-dependent component of the sensor output signal. The desired output voltage, $\Delta v_{off}(T)$ is produced on line 619. Equation Eq. 23 shows that the desired output signal on line 619 is to behave as a first order Padé Approximant of an input voltage, $V_{Tin}$, which input voltage increases substantially linearly with environmental temperature. $V_{Tin}$ is generated by a secondary sensor means, 605. Thus, $V_{Tin}$ is an analog signal representing sensed temperature. The secondary temperature sensor means 605 is not to be confused with the primary parameter sensor (not shown yet, could be a pressure sensor) whose output is being conditioned to counteract temperature effects. The temperature sensor means 605 can be integrally included within the monolithic IC that implements the rest of circuit 600.

$$\Delta v_{off}(T) = \left(\frac{a \cdot V_{Tin} + b}{c \cdot V_{Tin} + 1}\right) \qquad \text{(Eq. 23)}$$

In the circuit 600 of FIG. 6, the $V_{Tin}$ voltage signal is applied to input port 611 of a variable gain amplifier 621 whose effective gain is programmably established, in part by DAC 637 and gain-setting register 647 to a partial gain value denoted as G. More correctly, the effective gain of amplifier 621 is reduced by another factor, $k_{vf} \cdot V_{out}(=k_{vf} \cdot \Delta V_{off}(T))$ which is generated by DAC 635 (digital to analog converter 635) so that the total effective gain of amplifier 621 is represented as $G \cdot (1 - k_{vf} \cdot V_{out})$ where $V_{out} = \Delta V_{off}(T)$. $V_{Tin}$ is multiplied by this total effective gain and then added in analog adder 622 to a programmably defined, bias voltage $v_{x0}$. The bias voltage $v_{x0}$ is established by DAC 632 and bias-setting register 642. The output of adder 622 defines the desired voltage, $\Delta v_{off}(T)$ produced on line 619. Feedback loop 615 is used to cause the generated output voltage, $\Delta_{voff}$ to satisfy above equation Eq. 23. More specifically, the fedback $\Delta v_{off}$ signal 615 is multiplied in DAC 635 by a third programmed parameter, $k_{vf}$ (set in register 645) so that circuit 600 realizes the following, feedback-including transfer function of equation Eq. 24:

$$\Delta v_{off} = G \cdot (1 - k_{vf} \cdot \Delta v_{off}) \cdot V_{Tin} + v_{x0} \qquad \text{(Eq. 24)}$$

By isolating the output $\Delta v_{off}$, the expression (Eq. 24) can be re-written as following equation, Eq. 25:

$$\Delta v_{off} = \frac{G \cdot V_{Tin} + v_{x0}}{G \cdot k_{vf} \cdot V_{Tin} + 1} \qquad \text{(Eq. 25)}$$

Thus it is seen that the generated $\Delta v_{off}$ signal (619) emulates a first order Padé Approximant per above equation Eq. 23, wherein the substitutions of equations set Eqs. 26 are used:

$$\begin{cases} a = G \\ b = v_{x0} \\ c = G \cdot k_{vf} \end{cases} \qquad \text{(Eqs. 26)}$$

Stated otherwise, equation Eq. 24 is re-written as following equation Eq. 27:

$$\Delta v_{off} = a \cdot \left(1 - \frac{c}{a} \cdot \Delta v_{off}\right) \cdot V_{Tin} + b \qquad \text{(Eq. 27)}$$

Therefore, the circuit parameters G, $v_{x0}$, and $k_{vf}$ of FIG. 6 can be determined directly from the a, b, c coefficients, where the latter are calculated from temperature calibration measurements made in accordance with FIG. 4. The G, $v_{x0}$, and $k_{vf}$ circuit parameters may be programmed into a nonvolatile (NV) memory means (e.g., EEPROM or Flash) that is included within or coupled to the IC that implements circuit 600. The NV-stored, circuit parameters may then be downloaded from the NV storage means (or from elsewhere) into the respective registers 647, 642 and 645 that that control gain, bias and feedback by way of the dedicated D/A converters, 637, 632 and 635, as shown in FIG. 6. The programmable building blocks that form circuit 600 are individually known in the art. (See for example: Harrold, S., "Programmable analog ICs", Sensor Magazine, April 2003; and Dunbar and Allen, "Performance grows with integration", EE Times, Oct. 7, 2003; which published references are incorporated herein by reference.)

Figure 7:
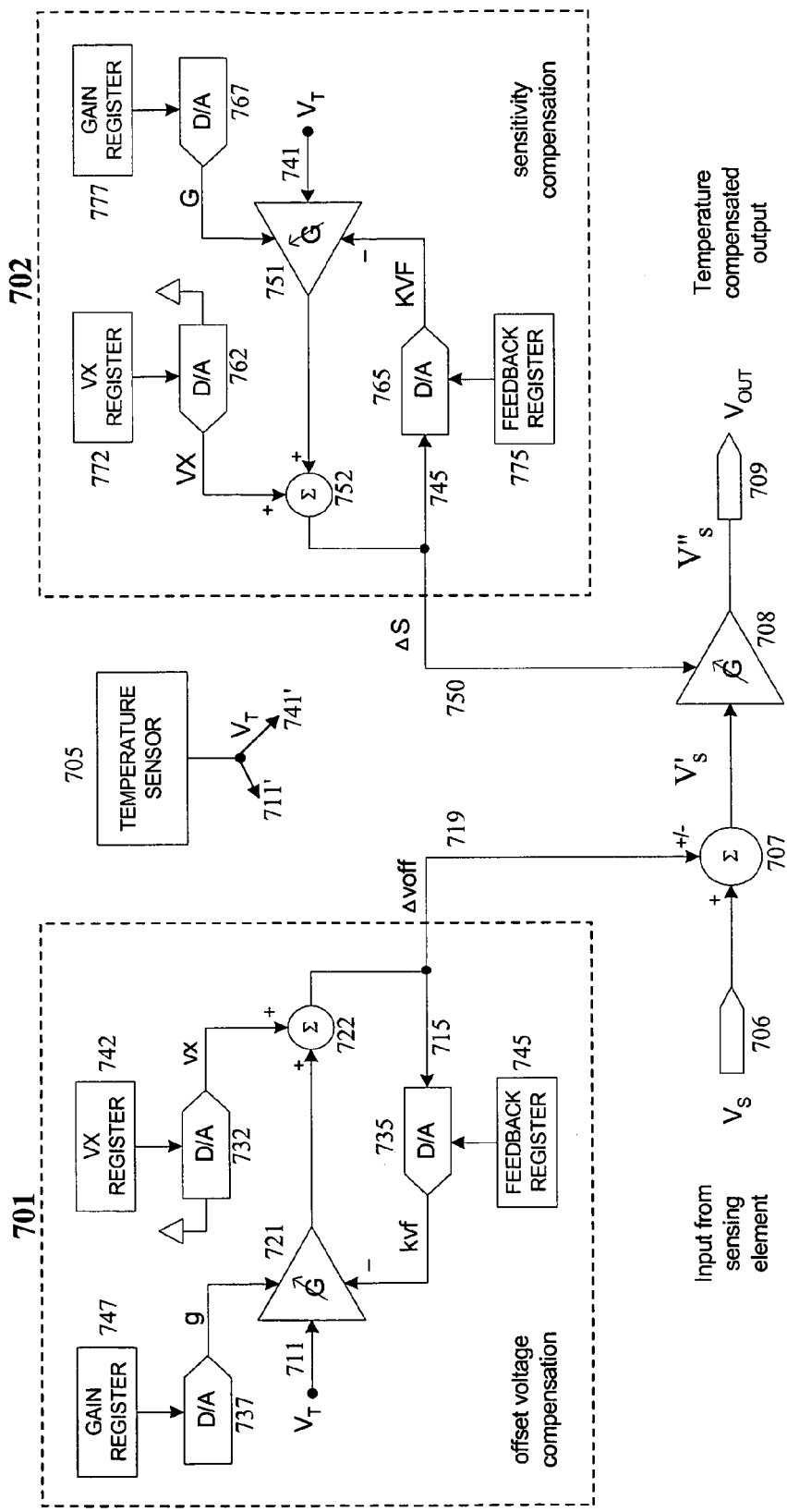
FIG. 7 is a schematic diagram of a mostly analog embodiment of a circuit for countering temperature-dependent aspects of sensor offset and sensor sensitivity.

Referring to FIG. 7, a second temperature compensation circuit 700 in accordance with the invention is shown. Where practical, like reference numbers in the "700" century series are used to refer to alike elements of FIG. 6 that were numbered in the "600" century series. As such, it is not necessary to repeat an explanation for block 701 of circuit 700 because block 701 is essentially the same as circuit 600 except that the on-chip temperature sensing means 705 (which could alternatively be off-chip) is shown outside of block 701 and is shown to be further coupled to temperature input line 741 of second block 702. It should be apparent from FIG. 7 that the second block 702 is architecturally speaking, a mirror image of first block 701. Instead of generating a temperature-countering, offset correction signal (719), the second block 702 generates a temperature-countering, sensitivity correction signal on line 750, where the sensitivity correction signal is denoted as $\Delta S$.

Input terminal (e.g., package pin) 706 of the integrated circuit that implements temperature compensation circuit 700 receives a sensor output signal, $V_s$, from the temperature dependent sensor, which sensor is not shown, but could be a resistive pressure sensor, or a reactive position sensor, or some other sensor which is to measure a corresponding physical parameter while operating across a predefined temperature range, i.e., T1-T3. The received sensor output signal, $V_s$ is applied to an analog summing unit 707 so that the temperature-dependent, offset voltage, $\Delta v_{off}(T)$ (on line 719) can be subtracted out. The output voltage of summing unit 707 is then coupled to a variable gain amplifier (or attenuator) 708 so that the offset-free, sensor output signal, $V'_s$ can be multiplied by the value of the sensitivity correction signal, $\Delta S$. The twice corrected, sensor output signal, $V''_s$ can then be output from output terminal (e.g., package pin) 709 of the integrated circuit for further processing. Alternatively or additionally, the corrected, sensor output signal, $V''_s$ can be coupled to on-chip circuitry (not shown) for further use or processing within the IC that contains circuit 700. For purpose of simplicity, FIG. 7 does not show removal of a temperature-invariant offset from the received sensor output signal, $V_s$. It should be apparent from the above theoretical explanation that such a temperature-invariant offset should also be subtracted out at summing unit 707.

Referring to block 702 of FIG. 7, the Padé Approximant function for sensitivity correction is implemented by an analogous means to that of block 701 except that the output signal 750 is representative of a gain adjustment, $\Delta S$ rather than of an offset voltage. The $\Delta S$ signal can be used as a gain control voltage applied to a corresponding gain control node of a voltage-controlled amplifier (VCA) 708 to thereby translate the voltage signal into a corresponding gain correction. An expression for the desired gain correction is provided in equation Eq. 28:

$$\Delta S = A \cdot \left(1 - \frac{C}{A} \cdot \Delta S\right) \cdot V_T + B \quad \text{(Eq. 28)}$$

Capital letters, A, B and C are used in equation Eq. 28 to represent the programmably established coefficients corresponding to the lower case ones expressed in equations Eq. 26 and 27. Of course, the values for the capitalized coefficients, A, B and C are established to provide an appropriate sensitivity correction $\Delta S$ rather than an offset correction. See again, FIG. 5.

Figure 8A:
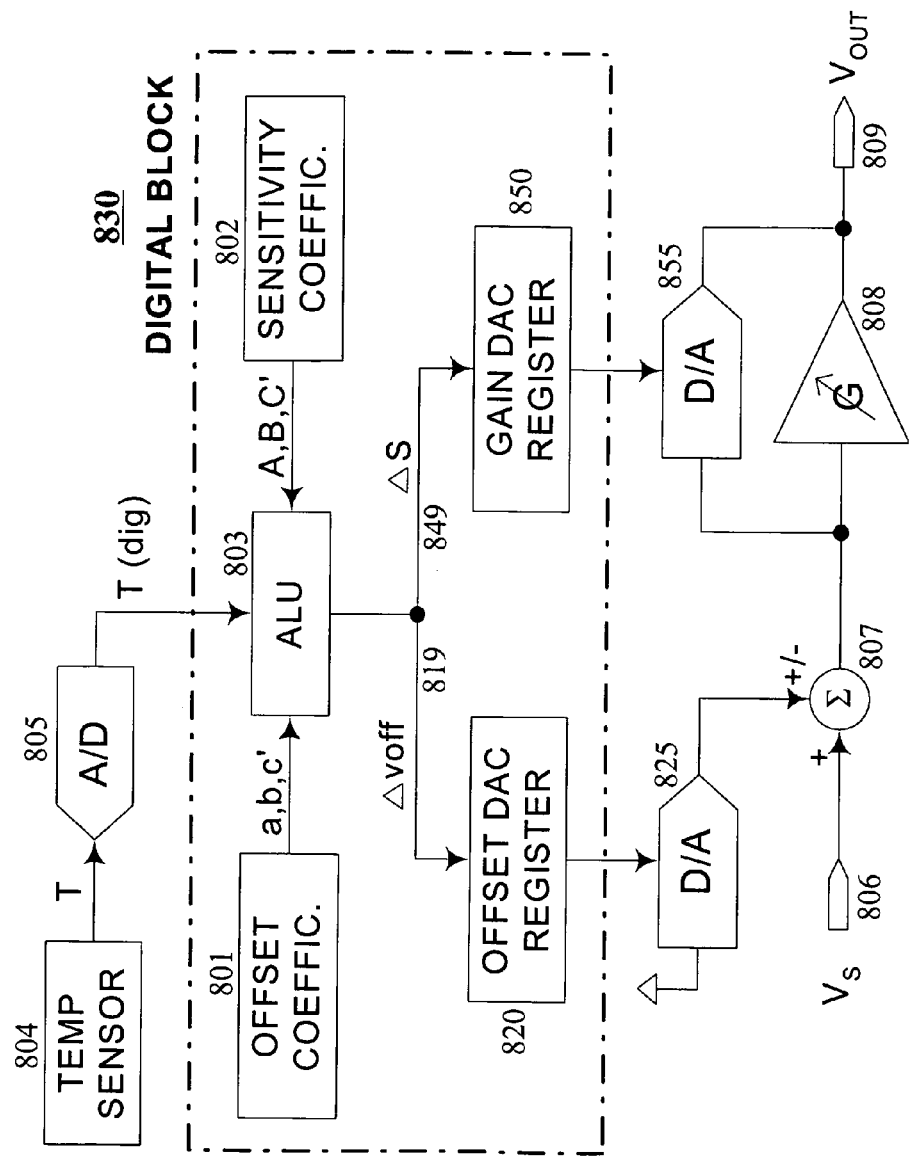
FIG. 8A is a block diagram of a more digital embodiment of a circuit for countering temperature-dependent aspects of sensor offset and sensor sensitivity.

Although FIG. 7 shows a mostly analog solution (where the transition from the digital signal domain to the analog domain is provided by the six illustrated DAC's: 742, 745, 747, 772, 775, and 777; there are many other possible ways to implement circuitry for realizing the desired temperature compensation. FIG. 8A provides a block diagram of an alternate implementation 800 wherein the temperature compensations for offset and sensitivity are computed in the digital domain by a programmable, arithmetic logic unit (ALU) 803 and the digital result signals, 819 ($\Delta v_{off}(T)$) and 849 ($\Delta S$) are then applied to an analog signal path, 806-809 by way of registers 820, 850 and DAC's 825, 855 respectively. DAC 855 forms part of a gain-setting loop path (feedback or feedforward) of analog amplifier 808 and thus modifies the gain of that amplifier circuitry (e.g., by modifying the feedback impedance). An advantage of an implementation that is more digital than analog is that it can be realized with low power CMOS circuitry and the digital portion is more immune to noise, as well as being more easily programmable Referring to FIG. 8B, a variation on embodiment 800 is shown at 880. A resistive bridge pressure sensor is shown at 860 and a differential input buffer is shown at 861. Pressure applied to the sensor 860 is represented by meter 859 as having at least three settings: $P_{FS}$ for full scale, $P_M$ for mid scale, and $P_0$ for a reference zero pressure (i.e. one atmosphere). The analog input amplifier 865 has an offset input terminal 864 which can be used to apply a coarse offset to the output provided by buffer 861. Register 862 stores a digital signal representing a coarse, temperature-invariant offset value and DAC 863 converts the stored value into a corresponding analog signal value supplied to offset input terminal 864. Summing unit 867 adds to this a temperature-invariant, fine offset value and also the temperature dependent component. The analog output voltage of DAC 825' may be represented by the following equation, Eq. 29a:

$$\Delta voff(T) = k\left[\left(\frac{a \cdot V_T + b}{c \cdot V_T + 1}\right) + fo\right] \quad \text{(Eq. 29a)}$$

where k is a DAC-conversion coefficient describing a proportionality relationship between the digital code held in the fine-offset register 824' (fo) and the digital code held in the temperature-compensation register 820' to the actual voltage, $V_{out3}$ output by adder 870 in response to the DAC output voltage, $\Delta v_{off}$, produced by DAC 825'. Due to manufacturing variances, a different k factor generally occurs for each individual embodiment of DAC 825' as well as for each individual embodiment of amplifiers 868 and 869. Mass production variance in this digital-to-analog conversion factor, k, can reduce post-compensation accuracy if k is not accurately determined for each of mass produced circuits. The value of k can be accurately determined for a given circuit by measuring the voltage, $V_{out3}$ at the output of circuit 880 as fo is varied. During calibration, it will generally be desirable to adjust fo so as to cause $V_{out3}$ to equal a base reference magnitude (which may be referred as a relative zero) when a reference pressure, $P_0$ is applied to the primary sensor 860 at a reference temperature, say T2. An off-chip, and detachably-connectable, calibration computer such as shown at 827' may be used for automatically carrying out the calibration process. In one embodiment, the computer 827' is operatively coupled to an external temperature controller 858 and to an external physical parameter (e.g., pressure) controller 859 for controlling these environmental attributes. The computer 827' is further temporarily operatively coupled to memory units 801' and 802' of the under-calibration, sensor chip 880 so as to set the temperature compensation coefficients stored therein. In order to avoid cluttering the drawing, not all operative couplings between the computer 827' and various internal parts of the under-calibration, sensor chip 880 (e.g., 824', 862, 866, 801', 802') are shown. Various signal coupling techniques may be used including serial transmission of control and data signals between the computer 827 and the sensor chip 880 to which the computer 827 temporarily couples in an operative manner (wired or wirelessly).

In order to determine k during calibration (automated or manual), the Pade' Approximant coefficients, a, b and c for offset are first reset to 0 and the coefficients, A, B and C for sensitivity are also set to zero so that the output voltage, Vout3 can be tuned coarsely and then finely for eliminating offset. The fine-offset register 824 is also initially reset to fo=0. After the coarse offset register 862 has been experimentally loaded via trial and error with a code value that reduces Vout3 to within an acceptable, coarse error range off of true zero (in one embodiment this was found to be within about 300 µV of zero) while pressure is held at P0 and temperature is held at the reference value (i.e., T2), a new non-zero value, fo' is loaded into the fine-offset register 824 so that a $\Delta V_{out3}$ difference can be measured. The procedure may be carried out under control of software code 826b stored within the calibration computer 827. The respective gains of amplifiers 865, 868 and 869 are don't cares in this procedure as long as they are held constant for the $\Delta V_{out3}$ measurements. In one embodiment, the gain of 865 is set at approximately 8, the gain of 868 is held at approximately 1 and the gain of 869 is held at approximately 3 during this procedure. Then the ALU 803' is caused to calculate the value of k as simply the ratio, $\Delta V_{out3}/\Delta f0$. This value for k is stored in the DAC coefficients register 826a of the calibration computer for later use when the computer will use equation. Eq. 29a to calibrate the a, b and c coefficients of temperature compensation register 801'. The saved k value is also used by the calibration computer 827 to compute the fine offset code that is to be stored in register 824. The $V_{out3}$ value measured at the end of the step for calculating k will often be other than zero. The correction that is to be added to f0 to bring $V_{out3}$ closer to zero will simply be: $\Delta f0 = \Delta V'_{out3}/k$ where $\Delta V'_{out3}$ is the change to be made to $V_{out3}$ to bring it close to zero. It has been found for one specific embodiment that this fine tuning of the offset register can cause $V_{out3}$ to converge from the outer reaches of the coarse tuning range (about 300 µV away from true zero) to approximately within 2 µV of zero while the pressure at the primary sensor is held at P0 and the temperature is correspondingly held at the reference value (i.e., T2). Once fo and k are set, the automated calibration process (826b) may proceed to determining the appropriate values for a, b and c while the sensor parameter (e.g., pressure in the case of 860) is held constant at the reference value (P0) and the temperature, as set for example by the external temperature controller 858, is switched among the at least 3 test points: T1, T2 and T3. The method of above Eqs. 9-13 may be used by calibration software 826b.

Figure 8B:
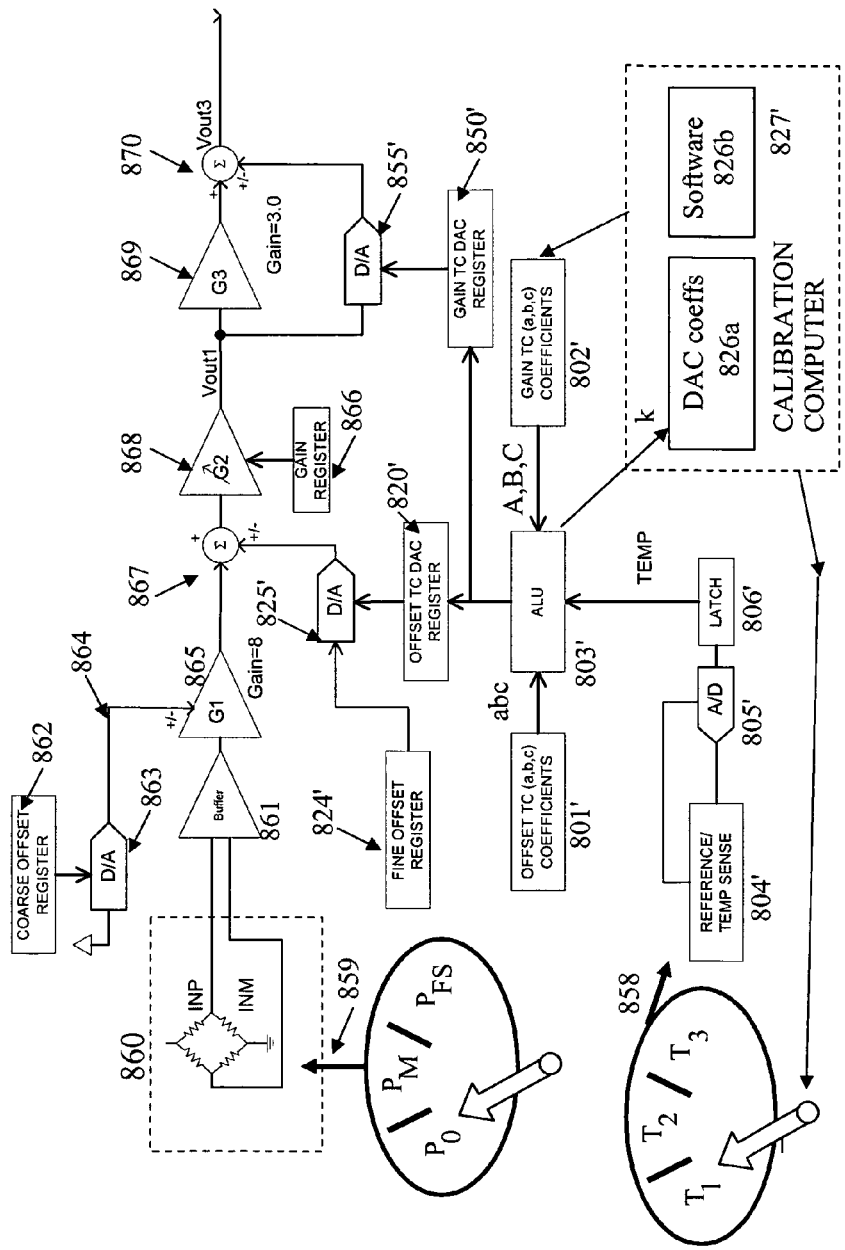
FIG. 8B is a schematic diagram of a specific implementation of FIG. 8A, including showing how a calibration computer interconnects with the temperature compensation IC during mass production calibration.

In one embodiment of FIG. 8B, the code normalizations of following equation Eq. 29b are used:

$$\Delta voff(T) = k \left[ \left( \frac{a \cdot T + 4b}{\frac{c \cdot T}{256} + 64} \right) + 2 * fo + 512 \right] \quad \text{(Eq. 29b)}$$

The value in the big square brackets parentheses is represented by the digital codes sent to the fine-tuning DAC 825'. k represents the conversion of the DAC codes to the final output voltage, $V_{out3}$. The constants used in equation Eq. 29b, namely, 4, 256, 64, 2, and 512 were chosen to optimize the equation for a specific fixed point DSP so as to keep the digital code value within a range of 0 to 1023 for a 10-bit DAC provided within that DSP. More specifically, for the specific DSP, the range of the T code was kept in the range, −127 to +127, to represent a digital temperature with 255 discrete levels. In one embodiment, the code value of T=0 was used to represent room temperature. The fine-tuning register 824' had 8 bits while the fine-tuning range was allowed to have 1024 discrete levels. The setting of f0=0 placed the expression 2*fo+512 in the middle of the 10 bit range. Similarly, the scaling factors for the b and c coefficients as well as the constants used elsewhere within Eq. 29b were chosen to optimize the equation for the specific fixed point DSP so as to keep the resultant code value within a range of 0 to 1023 for the 10-bit DAC provided in that specific DSP. Of course, it is within the contemplation of the invention to use other appropriate constants for embodiments that use DAC's and/or code-holding registers with different digital resolutions.

Note that with the more digitized embodiments 800, 880 of FIGS. 8A-8B; that instead of using brute force division, as might be suggested by equations Eqs. 29a-29b, it is alternatively possible to use the iterative feedback form of the Pade' Approximant expression and to thus avoid the need for performing a brute force division. More specifically, the calculations for the offset and sensitivity digital codes can be iteratively computed per the following computer program expressions, Ex. 30a and 30b:

$$\Delta voff_{code} = a \cdot (1 - c' \cdot \Delta voff_{code}) \cdot T_{code} + b \quad \text{(Ex. 30a)}$$

$$\Delta S_{code} = A \cdot (1 - C' \cdot \Delta S_{code}) \cdot T_{code} + B \quad \text{(Ex. 30b)}$$

where c'=c/a, and C'=C/A.

ALU 803' may therefore use the iterative procedures of expressions, Ex. 30a and Ex. 30b to regularly update the offset and sensitivity codes of registers 820' and 850' (or 820 and 850 of FIG. 8A) as the sensed temperature (T) changes rather than having to perform brute force division. The coefficients a, b, c' and A, B, C' are stored in a NV or other appropriate memory 801' and 802'. If the arithmetic logic unit (ALU) carries out the additions/subtractions and multiplications of expressions, Ex. 30a-30b to thereby iteratively update the temperature compensation codes in registers 820 (or 820') and 850 (or 850') as the temperature varies, the size of the ALU may be kept relatively small, and the power consumption of the temperature compensation chip 880 may be kept relatively small. The iteratively computed codes of registers 820' and 850' control the DACs (825' and 855') that then provide analog offset and analog gain-control signals into the analog signal path 806-809 (or 860-870 in the case of FIG. 8B).

Figure 9:
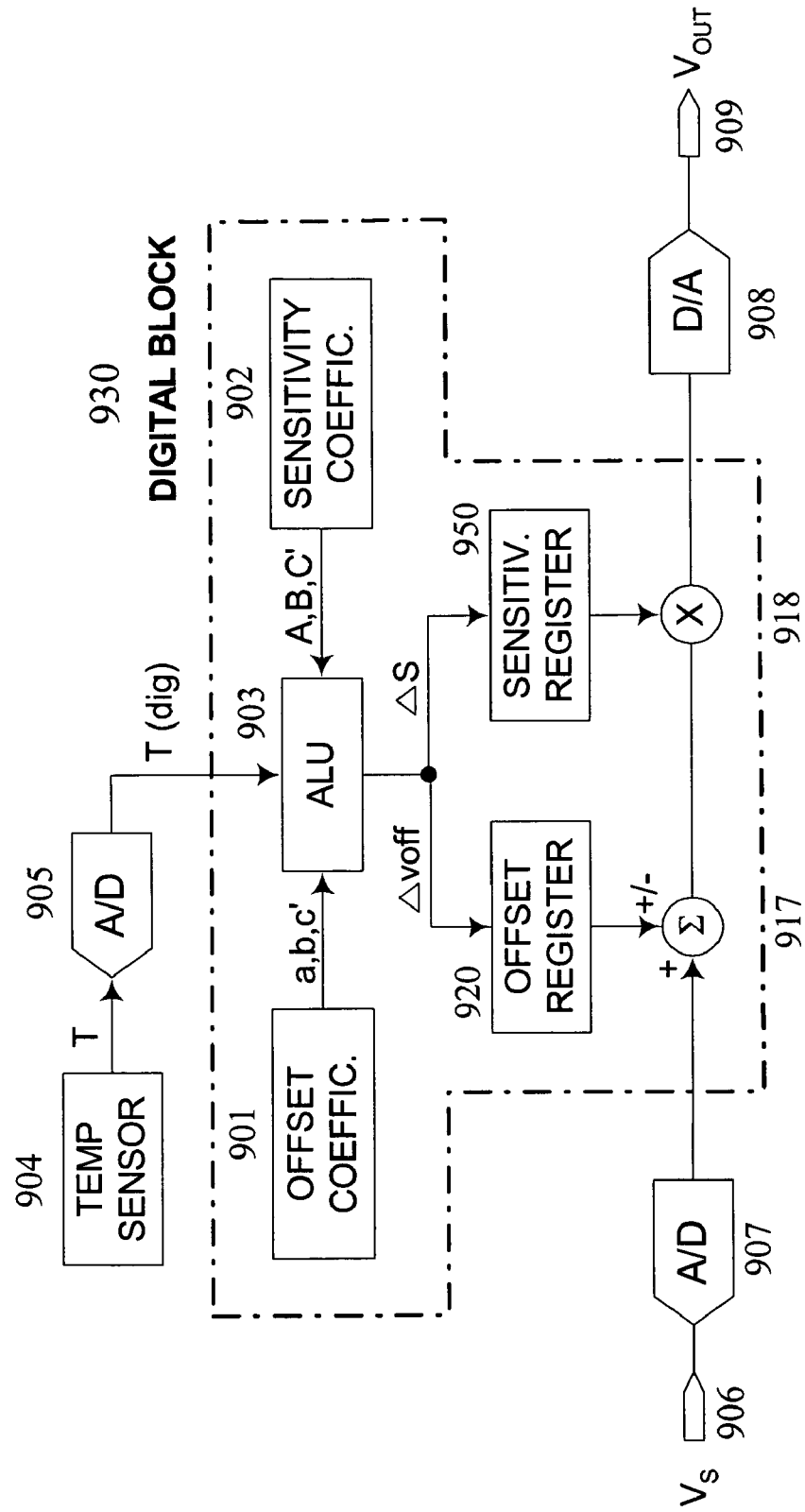
FIG. 9 is a block diagram of a yet more digital embodiment of a circuit for countering temperature-dependent aspects of sensor offset and sensor sensitivity.

Referring to FIG. 9, another possible embodiment is the yet-more digital approach shown at 930. The offset subtractor 917 is implemented within digital block 930 as is also the sensitivity multiplier 918. Analog-to-digital converter (ADC) 907 digitizes the VS sensing signal coming from the sensing means. The inverse, digital-to-analog conversion shown at 908 is optional since quite often it will be the digital output of multiplier 918 that is forwarded serially or otherwise (e.g. by use of pulse-width-modulation based communications) to a system computer (e.g. to an automobile's control and display computer) for further processing. The optional DAC 908 can be included at the output, in the case where an analog Vout is desired at IC terminal 909.

Figure 10:
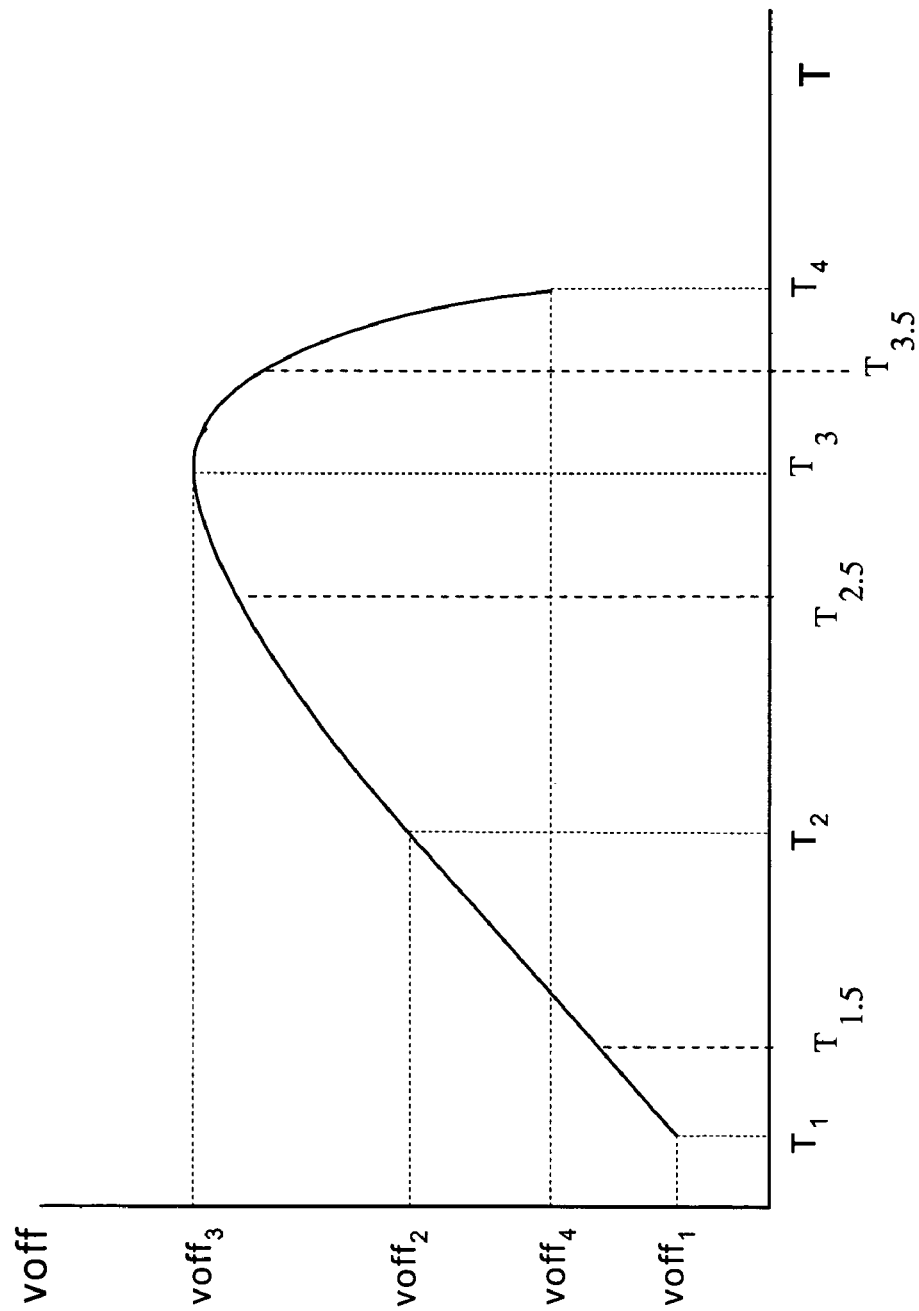
FIG. 10 is an exemplary graph of sensor offset versus temperature, used to explain piece-wise temperature compensation and calibration for different temperature sub-ranges.

The areas outlined in FIGS. 8A-8B and FIG. 9 as constituting the digital block (830 or 930) use essentially only digital operations. These digital operations can be executed by a microcontroller, a microcomputer, a digital signal processor (DSP) or other such means. However, as the operations executed in blocks 830/930 are relatively few and quite basic (addition, multiplication, register storage), a simple dedicated DSP circuit can be a more cost-effective solution for high volume mass production applications. Although FIG. 9 may appear to suggest just one set of coefficients, namely, a, b, and c being stored in memory 901 and only one further set of coefficients, namely, A, B, and C being stored in memory 902; it is within the contemplation of the disclosure to treat the digitized temperature-indicating signal, T(g) as identifying or representing a succession of temperature subranges and to store within memory units 901 and 902 corresponding sets of Pade' Approximant coefficients. More significant bits of the temperature-indicating signal, T(g) may be used directly as address inputs for the multi-range memory units 901 and 902. Alternatively, the digitized temperature-indicating signal, T(g) may be first processed by the ALU 903 to thereby produce memory addressing signals that are then applied to the multi-range memory units 901 and 902 for fetching the approximate Pade' Approximant coefficients to be used for each temperature subrange. The next described, FIG. 10 shows an example.

Although continuous solutions are illustrated above, specific classes of sensors may benefit from alternative variations of the invention where piece-wise Pade' Approximant solutions are stitched together with other Pade' Approximant solutions or even with polynomial and/or linear and/or other piece-wise solutions. There are cases where higher accuracy can be achieved by splitting the specified operating temperature range T1-T4 (FIG. 10) of the utilized sensing means into multiple subranges and by performing nonlinear or linear local temperature compensation inside each one of the subranges. FIG. 10 shows an example wherein a hypothetical sensing element has an offset variation over its operating temperature range with three distinct subranges, namely:

T1 to T2: a first subrange with linear offset variation;

T2 to T3: a nonlinear second subrange that includes an intermediate point, $T_{2.5}$; and T3 to T4: a nonlinear third subrange that includes an intermediate point, $T_{3.5}$.

Each one of these three exemplary sensor offset subranges can be better addressed by a respective custom set of linear or nonlinear temperature compensation coefficients rather than by single, common set of coefficients. Any of the above-described implementations of offset temperature compensation can be selected as appropriate for handling this exemplary sensor. A few minor additions may be provided in the above-described circuits for detecting the switch-over from one temperature subrange to the next. For example, two analog or digital comparators may be added with respective detection thresholds set to detect the temperature crossings at T2 and T3 of FIG. 10. The outputs of these comparators are periodically checked to determine whether there has been a change of temperature subrange. Alternatively, an ALU such as 903 of FIG. 9 may be programmed to determine when a switch-over is to be carried out and what appropriate set of coefficients to use. In the particular example 1000 given by FIG. 10, there are three possibilities:

1) If T≦T2 (and optionally, T>T1), then the sensor offset is in the linear first subrange. To implement a linear temperature compensation, the feedback path may be simply eliminated. The $k_{vf}$ feedback coefficient in equation Eq. 24 or Eq. 30 for example, may be simply zeroed and as a result, the new transfer function for the respective analog or digital implementation becomes respectively:

$$\Delta voff = a \cdot V_T + b \quad (Eq. 31)$$

$$\Delta voff_{code} = a \cdot T_{code} + b \quad (Eq. 32)$$

2) If T2<T≦T3, the sensor offset is in the nonlinear second subrange and the set of nonlinear temperature compensation coefficients $a_1$, $b_1$, $c_1$ can be calculated as previously discussed (with the calibration points being $T_2$, $T_{2.5}$ and $T_3$) and this first nonlinear temperature compensation characteristic can be used when temperature is in this second subrange. In one embodiment, T2 is used as a joint calibration point for the first compensating means used for the first subrange, T≦T2, and also for the second compensating means used for the second subrange, T2<T≦T3, thus assuring that the two solutions will meet at a same precise value ($V_{off2}$). Thus a continuous compensation function is provided over at least the first and second subranges.

If T>T3 (and optionally, or T≦T4), the sensor offset is in the nonlinear third subrange and another set of nonlinear TC coefficients $a_2$, $b_2$, $c_2$ can also be calculated as previously discussed (with the calibration points being $T_3$, $T_{3.5}$ and $T_4$) and this second nonlinear temperature compensation characteristic can be used when temperature is in this third subrange. In one embodiment, T3 is used as a joint calibration point for the second compensating means used for the second subrange, T2<T≦T3, and also for the third compensating means used for the third subrange, T>T3, thus assuring that the second and third solutions will meet at a same precise value ($V_{off3}$). Thus a continuous compensation function is provided over at least the second and third subranges.

A similar procedure can be used for managing the sensitivity counter-compensation. In the general case, distinct sets of temperature compensation coefficients are stored for each nonlinear or linear subrange for both offset and sensitivity. This concept can be extended for a plurality of nonlinear and linear offset and sensitivity subranges, where each one is managed by an additional calibration set of steps, by an extra window comparator, and by another set of coefficients.

When a given sensing means is first characterized, it is sometimes not known if a given subrange, say T1-T2, is linear or non linear. Thus it is not immediately known whether to use a piecewise linear compensation for that temperature subrange or a nonlinear one (e.g., one that is modeled by a Pade' Approximant emulation). In accordance with one aspect of the invention, at least 3 calibration points are taken for each subrange with sharing of calibration results at the boundaries (e.g., T2, T3) of those subranges. For example, for the T1-T2 subrange, measurements are taken at boundary points T1 and T2 and also at an intermediate point, $T_{1.5}$. Then it is determined if the measured characteristic (e.g., $V_{off}$) at the intermediate point $T_{1.5}$ is sufficiently close to being linear with the measurement results ($V_{off1}$, $V_{off2}$) taken at the boundary points T1 and T2. If yes, then a linear correction algorithm is used. If no, then a nonlinear correction algorithm (e.g., a Pade' Approximant based algorithm) is used. The amount of error allowed before an intermediate characteristic is deemed to be nonlinear as opposed to being close to linear can vary from application to application and is predefined within the context of a given application. In the illustrated example, when the measured characteristic (e.g., $V_{off}$) at the intermediate point $T_{2.5}$ is compared against the end point results of T2 and T3, it is found that this intermediate result is nonlinear. Consequently, the 3 data points of T2, T2.5 and T3 are used for generating appropriate Pade' Approximant coefficients for the T2-T3 subrange. Similarly, when the measured characteristic at the intermediate point $T_{3.5}$ is compared against the end point results of T3 and T4, it is found that this intermediate result is nonlinear. Consequently, the 3 data points of T3, T3.5 and T4 are used for generating appropriate Pade' Approximant coefficients for the T3-T4 subrange.

Although embodiments discussed herein implement first order Padé Approximants as a means for providing nonlinear temperature compensation, it is within the scope of the invention to use higher order Padé Approximants, including those where numerator and denominator have different orders. Also, both numerator and denominator may be multiplied by any constant without affecting the intended results. Therefore the constant 1 coefficient in the exemplary denominator used herein (see for example, Eq. 23) may be replaced by any real constant (see Eqs. 29a and 29b). Moreover, it is possible to implement second or higher order Padé Approximants as a means for providing nonlinear temperature compensation while still using only a few coefficients (e.g. 4 coefficients) by restricting the variability in the higher order polynomial of the numerator or denominator. Consider for example, the following equation, Eq. 33a:

$$y_{1,2}(x) = \frac{P_1(x)}{Q_2(x)} = \frac{ax+b}{(cx^2+dx+1)} \quad \text{(Eq. 33a)}$$

In such a case, there are four unknowns, a, b, c and d, to be resolved by use of four or more calibration measurements. A second order Pade' Approximant such as shown in Eq. 33a can be obtained using the concept of FIG. 6, but carried out to a greater level of complexity. FIG. 6 shows a variable gain stage 621 where the variable gain is a sum of a function of just the output voltage ($k \cdot V_{out}$) and a constant. However, if the variable gain is made a function of input voltage as well, $V_{in}=V_{Tin}$, then a higher order Pade' Approximant similar to that shown in Eq. 33a may be obtained without use of brute force division. Consider the general, variable gain result of Eq. 33b and then the substitution shown in Eq. 33c:

$$V_{out} = G_{variable} \cdot V_{in} + b \quad \text{(Eq. 33b)}$$

$$V_{out} = (a - d^*V_{out} - c^*V_{in}^*V_{out}) \cdot V_{in} + b \quad \text{(Eq. 33c)}$$

By collecting like terms from equation Eq. 33c, the pre-division expression of equation Eq. 33d is easily arrived at:

$$V_{out} \cdot (1 + d^*V_{in} + c^*V_{in}^2) = a \cdot V_{in} + b \quad \text{(Eq. 33d)}$$

Solving for $V_{out}$, one arrives at the form shown in Eq. 33a. Four calibration measurements may be used to solve for the four coefficients, a, b, c and d of equations Eq. 33a-33d.

Aside from using N measurements (e.g., N=3, N=4) for providing N equations with N unknowns for a first or higher order Pade' Approximant emulation, various mathematically based methods of curve fitting may be used for determining optimized Pade' Approximant coefficients, such as least squares or any other linear or nonlinear regression method. Numerical computational methods can also be used to determine the number of subranges and their thresholds within given constraints.

It is seen in light of the above that the present invention can provide very flexible and powerful solutions for controlling temperature compensation parameters without need for complex circuitry to implement the controlling functions. Performance can be optimized by appropriate selection of the sensor temperature range or subranges and by making sure that temperature nonlinearities within any individual subrange are not too severe and are, preferably, monotonic. Also, DAC's with relatively large number of input bits may be used to allow for finer granularity of control and higher overall accuracy. Higher order Padé Approximants and a larger number of calibration points may also increase accuracy. Accordingly, a tradeoff between accuracy and complexity may be desirable in the more demanding applications. The invention has wide application in sensor interface IC's and/or other systems whose functionalities include that of correcting temperature-dependent nonlinearities. By way of example, a single automotive sensor ASIC typically calls for mass production volumes in the range of 2 to 3 million units/year and low per unit price. The simplicity of circuits made in accordance with the invention allow for low cost and high yields (due to reduced die size).

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

By way of a further example, it is understood that the configuring of a programmable, Pade' Approximant emulating device (e.g., 800 of FIG. 8A) in accordance with the disclosure can include use of a computer (e.g., 827 of FIG. 8B) to control calibration procedures and to program the derived coefficients into appropriate on-chip memory. Accordingly, a computer-readable instructing medium or another form of software product or machine-instructing means (including but not limited to, a hard disk, a compact disk, a flash memory stick, or a downloading of manufactured instructing signals over a network into computer 827) may be used for instructing an instructable machine (e.g., computer 827) to carry out such calibration activities in accordance with the invention. As such, it is within the scope of the disclosure to have an instructable machine carry out, and/to provide a software product adapted for causing an instructable machine to carry out one or more machine-implemented methods of calibrating mass produced sensor conditioning circuits in accordance with procedures described above.

Reservation of Extra-Patent Rights, Resolution of Conflicts, and Interpretation of Terms After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A method for providing temperature-variation countering compensation to a sensing signal produced by a sensing means where the sensing signal primarily represents a primary physical parameter measured by the sensing means, said primary physical parameter being one other than temperature and where the sensing means exhibits at least one of a nonlinear temperature-dependent offset and a nonlinear temperature-dependent sensitivity, the method comprising:
   (a) obtaining a signal indicative of effective temperature to which the sensing means is subjected to; and
   (b) from the obtained temperature-indicating signal, generating one or more temperature-variation compensating signal representing a corresponding one or more Pade' Approximant functions of the temperature-indicating signal, where at least one of the Pade' Approximant functions is a nonlinear one that has a nonconstant denominator that varies with variations of said temperature-indicating signal.

2. The method of claim 1 and further comprising:
   (c) offsetting the sensing signal produced by the sensing means with at least one of said generated one or more compensating signals.

3. The method of claim 2 wherein:
   (a.1) said temperature-indicating signal is obtained from a temperature sensing circuit that is monolithically integrated with one or more circuits that generate corresponding ones of said one or more compensating signals.

4. The method of claim 2 wherein:
   (b.1) said Pade' Approximant functions include at least one first order Pade' Approximant function having just three programmably-defined coefficients.

5. The method of claim 4 and further comprising:
   (d) taking measurements of the sensing signal produced by the sensing means at three or more different temperatures for determining said three programmably-defined coefficients.

6. The method of claim 5 and further comprising:
   (e) solving three simultaneous equations for determining said three programmably-defined coefficients.

7. The method of claim 1 and further comprising:
   (c) multiplying the sensing signal or a signal containing the sensing signal with at least one of said generated one or more compensating signals.

8. A device for providing temperature-variation countering compensation to a sensing signal produced by a sensing means, where the sensing signal primarily represents a primary physical parameter measured by the sensing means, said primary physical parameter being one other than temperature and where the sensing means exhibits at least one of a temperature-dependent offset and a temperature-dependent sensitivity, the device comprising:
   (a) temperature determining means for determining temperature of a given sensing means; and
   (b) compensation generating means, operatively coupled to the temperature determining means, for generating one or more compensating signals representing corresponding one or more Pade' Approximant functions of the temperature determined by said temperature determining means, where at least one of the Pade' Approximant functions is a nonlinear one having a temperature-dependent denominator.

9. The device of claim 8 and further comprising:
   (c) offsetting means, operatively coupled to the compensation generating means, for combining a nonlinear offset countering signal produced by the compensation generating means with the sensing signal produced by the given sensing means.

10. The device of claim 8 wherein:
    (a.1) said temperature determining means includes a temperature sensing circuit that is monolithically integrated with one or more parts of said compensation generating means.

11. The device of claim 8 wherein:
    (b1) said Pade' Approximant functions include at least one first order Pade' Approximant function having just three programmably-defined coefficients.

12. The device of claim 11 wherein:
    (b.2) said compensation generating means, includes memory means for storing said, just three programmably-defined coefficients.

13. The device of claim 8 wherein:
    (b1) said compensation generating means includes iterative means for iteratively generating the one or more compensating signals.

14. A device for providing temperature-variation countering compensation to a sensing signal produced by a sensing means, where the sensing signal primarily represents a primary physical parameter measured by the sensing means, said primary physical parameter being one other than temperature and where the sensing means exhibits at least one of a temperature-dependent offset and a temperature-dependent sensitivity, the device comprising:
   (a) temperature determining means for determining temperature of a given sensing means;
   (b) compensation generating means, operatively coupled to the temperature determining means, for generating one or more compensating signals representing corresponding one or more Pade' Approximant functions of the temperature determined by said temperature determining means, where at least one of the Pade' Approximant functions is a nonlinear one having a temperature-dependent denominator; and (c) sensitivity compensating means, operatively coupled to the compensation generating means, for modifying the sensing signal produced by the given sensing means with a temperature-dependent and nonlinear, sensitivity variation countering signal produced by the compensation generating means so as to reduce variation of the modified sensing signal to temperature changes.

15. A method of compensating for nonlinear behavior of a given sensing device in response to changing temperature where the given sensing device is used for producing a primary sensing signal representing a physical parameter other than temperature, the method comprising:

applying one or more Padé Approximant-based transformation functions to the primary sensing signal of the given sensing device so as to thereby substantially cancel out or substantially reduce one or more of the nonlinear responses of the given sensing device to changing temperature in a predefined temperature range, where the one or more Padé Approximant-based transformation functions are nonlinearly responsive to a temperature to which the given sensing device is subjected;

wherein said step of applying one or more Padé Approximant-based transformation functions includes:

providing a first Padé Approximant-based generating circuit that models a nonlinear temperature-dependent offset of the given sensing device; and providing a second Padé Approximant-based generating circuit that models a reciprocal of a nonlinear temperature-dependent sensitivity of the given sensing device.

16. The method of claim 15 wherein each of said first and second Padé Approximant generating circuits operates in accordance with a respective first order Padé Approximant function having temperature as a variable in its denominator.

17. The method of claim 15 wherein said first Padé Approximant-based generating circuit operates in accordance with the equation:

$$V_{\mathit{off}}(T) \cong \left[ \mathit{voff}_0 + \left( \frac{a \cdot T + b}{c \cdot T + 1} \right) \right]$$

where T is a variable signal that changes substantially linearly with the temperature to which the given sensing device is subjected, $V_{\mathit{off}}(T)$ is an output signal of the first Padé Approximant-based generating circuit, $\mathit{voff}_0$ is a sensing device offset that appears at an output of the given sensing device when the sensed primary physical parameter is at a predefined reference magnitude, where $T_0$ is a predefined reference temperature at which the $\mathit{voff}_0$ offset value is measured, and where coefficients a, b, and c are offset temperature coefficients whose values are established so as to thereby substantially cancel out or substantially reduce an offset one of the temperature-modulated nonlinear responses of the given sensing device.

18. The method of claim 15 wherein said second Padé Approximant-based generating circuit operates in accordance with an inverse of the equation:

$$G_{\mathit{sensor}}(T) \cong \left[ S_0 \cdot \left( \frac{A \cdot T + B}{C \cdot T + 1} \right) \right]$$

where T is a variable signal that changes substantially linearly with temperature of the given sensing device, $G_{\mathit{sensor}}(T)$ is a reciprocal of an output signal of the second Padé Approximant-based generating circuit, $S_0$ is a sensitivity of the given sensing device at a predefined reference temperature, $T_0$, and A, B and C are sensitivity temperature coefficients whose values are established so as to thereby substantially cancel out or substantially reduce a sensitivity related one of the nonlinear responses of the given sensing device.

19. A method of compensating for nonlinear behavior of a given sensing device in response to changing temperature where the given sensing device is used for producing a primary sensing signal representing a physical parameter other than temperature, the method comprising:

applying one or more Padé Approximant-based transformation functions to the primary sensing signal of the given sensing device so as to thereby substantially cancel out or substantially reduce one or more of the nonlinear responses of the given sensing device to changing temperature in a predefined temperature range, where the one or more Padé Approximant-based transformation functions are nonlinearly responsive to a temperature to which the given sensing device is subjected; and wherein said step of applying one or more Padé Approximant-based transformation functions includes:

subtracting a first compensating signal from the primary sensing signal produced by the given sensing device where the first compensating signal represents a temperature dependent offset variable that varies nonlinearly relative to temperature in accordance with a first of said one or more Padé Approximant-based transformation functions, said subtracting producing an offset-compensated version of the primary sensing signal; and multiplying the offset-compensated version of the primary sensing signal by a second compensating signal, where the second compensating signal represents a temperature dependent gain variable that varies nonlinearly relative to temperature in accordance with a second of said one or more Padé Approximant-based transformation functions.

20. A method of compensating for temperature-dependent variation of a primary sensing signal output by a sensor, where primary sensing signal represents a primary physical parameter measured by the sensor, said primary physical parameter being one other than temperature, the method comprising:

(a) obtaining a first indicating signal that is indicative of a temperature to which the sensor is subjected;

(b) using the first indicating signal to generate a first temperature-variation compensating signal where the first temperature-variation compensating signal represents a first Padé' Approximant function of the first indicating signal and where the first Padé' Approximant function has a nonconstant denominator that varies with variations of said first indicating signal; and (c) combining the first temperature-variation compensating signal with the primary sensing signal.

21. The method of claim 20 and further comprising:

(d) using the first indicating signal to generate a second temperature-variation compensating signal where the second temperature-variation compensating signal represents a second Padé' Approximant function of the first indicating signal and where the second Padé' Approximant function has a nonconstant denominator that varies with variations of said first indicating signal; and (e) combining the second temperature-variation compensating signal with the primary sensing signal.

22. The method of claim 21 wherein said first and second Pade' Approximant functions are each of a first order.

23. The method of claim 21 wherein said generating of the first temperature-variation compensating signal in step (b) includes:
- (b1) coupling said first indicating signal to a first input terminal of a first multiplier;
- (b.2) coupling to a second input terminal of the first multiplier, a first feedback signal that is function of said first temperature-variation compensating signal so as to thereby cause the first multiplier to output a first product signal representing at least the first temperature-variation compensating signal multiplied by the first feedback signal; and wherein said generating of the second temperature-variation compensating signal in step (d) includes:
- (d.1) coupling said first indicating signal to a first input terminal of a second multiplier;
- (d.2) coupling to a second input terminal of the second multiplier, a second feedback signal that is function of said first temperature-variation compensating signal so as to thereby cause the second multiplier to output a second product signal representing at least the second temperature-variation compensating signal multiplied by the second feedback signal.

24. The method of claim 23 wherein said generating of the first temperature-variation compensating signal in step (b) further includes:
- (b.3) coupling the first product signal to a first input terminal of a first adder; and
- (b.4) using a sum signal output by the first adder to form said first feedback signal; and wherein said generating of the second temperature-variation compensating signal in step (d) further includes:
- (d.3) coupling the second product signal to a first input terminal of a second adder; and
- (d.4) using a sum signal output by the second adder to form said second feedback signal.

25. The method of claim 20 wherein said generating of a first temperature-variation compensating signal in step (b) includes:
- (b.1) coupling said first indicating signal to a first input terminal of a multiplier;
- (b.2) coupling to a second input terminal of the multiplier, a feedback signal that is function of said first temperature-variation compensating signal so as to thereby cause the multiplier to output a product signal representing at least the first temperature-variation compensating signal multiplied by the feedback signal.

26. The method of claim 25 wherein said generating of the first temperature-variation compensating signal in step (b) further includes:
- (b.3) coupling the product signal to a first input terminal of an adder; and
- (b.4) using a sum signal output by the adder to form said feedback signal.

27. A device that provides compensation for temperature-dependent variations in a primary sensing signal produced by a sensor, where the primary sensing signal represents a primary physical parameter measured by the sensor means and the primary physical parameter is one other than temperature, the device comprising:
- (a) a temperature indicator that produces a temperature indicating signal which is indicative of a temperature to which the sensor is subjected; and
- (b) a first compensation generator, operatively coupled to the temperature indicator and structured to generate a first temperature-variation compensating signal which represents a first Pade' Approximant function of the temperature indicating signal, where the first Pade' Approximant function has a nonconstant denominator that varies with variations of said temperature indicating signal; and
- (c) a combiner that combines the first temperature-variation compensating signal with the primary sensing signal.

28. The compensation providing device of claim 27 and further comprising:
- (d) a second compensation generator, operatively coupled to the temperature indicator and structured to generate a second temperature-variation compensating signal which represents a second Pade' Approximant function of the temperature indicating signal, where the second Pade' Approximant function has a nonconstant denominator that varies with variations of said temperature indicating signal; and wherein
- (c.1) said combiner combines the second temperature-variation compensating signal with the primary sensing signal or with a signal derived from the primary sensing signal.

29. The compensation providing device of claim 27 wherein said first compensation generator includes:
- (b.1) a variable gain amplifier having a first input terminal coupled to receive the temperature indicating signal, the amplifier further having a first output terminal for outputting a first output signal that is a function of the temperature indicating signal, and a gain control terminal controlling a variable gain applied to the temperature indicating signal;
- (b.2) a first summer, operatively coupled to the first output terminal for adding a first offset signal to the first output signal, the first summer having a second output terminal; and
- (b.3) a first multiplier, operatively coupled to the second output terminal, the first multiplier having a feedback factor terminal for receiving a proportional feedback factor signal and the first multiplier having a third output terminal for outputting a multiplied feedback signal representing the offset first output signal multiplied by the proportional feedback factor signal;

wherein the gain control terminal of the variable gain amplifier is operatively coupled to the third output terminal.

30. A system for providing temperature-variation countering compensation to a sensing signal produced by a sensor where the sensing signal primarily represents a primary physical parameter measured by the sensor, said primary physical parameter being one other than temperature and where the sensor exhibits a temperature-dependent offset and temperature-dependent sensitivity, the system comprising:
- (a) a temperature reporter that supplies a temperature-indicating signal indicative of effective temperature to which the sensor is subject to; and
- (b) an offset compensator that generates a first temperature-variation compensating signal that counters said temperature-dependent offset;
- (c) an adder that adds the first temperature-variation compensating signal to the sensing signal to thereby produce an offset-compensated sensing signal;
- (d) a sensitivity compensator that generates a second temperature-variation compensating signal that counters said temperature-dependent sensitivity; and (e) a multiplier that multiplies the offset-compensated sensing signal by the second temperature-variation compensating signal to thereby produce a sensitivity-compensated sensing signal;

wherein each of the offset compensator and sensitivity compensator is responsive to the temperature-indicating signal; and wherein each of the offset compensator and sensitivity compensator is reconfigurable into a respective configuration that generates its respective one of the first and second temperature-variation compensating signals as one that represents a corresponding Pade' Approximant function of the temperature-indicating signal, where the corresponding Pade' Approximant function is a nonlinear one that has a nonconstant denominator that varies with variations of said temperature-indicating signal.

31. The system of claim 30 and further comprising:

(f) piecewise reconfiguring means operatively coupled to at least one of the offset compensator and sensitivity compensator for reconfiguring the corresponding compensator in response to the temperature-indicating signal switching from a first predefined range to a second predefined range.

\* \* \* \* \*